United States Patent
Otten et al.

(10) Patent No.: US 8,269,147 B2
(45) Date of Patent: Sep. 18, 2012

(54) HOTPLATE, AND ALSO ASSEMBLY COMPRISING SUCH A HOTPLATE

(75) Inventors: Arno Rolf Otten, Heerhugowaard (NL); Nicolaas Petrus Klijn, Obdam (NL); Noël Pierre Van Aarst, Alkmaar (NL); Jan Ansing, Heerhugowaard (NL)

(73) Assignee: Bravilor Holding B.V. (NL)

( * ) Notice: Subject to any disclaimer, the term of this patent is extended or adjusted under 35 U.S.C. 154(b) by 592 days.

(21) Appl. No.: 12/523,719

(22) PCT Filed: Jan. 18, 2008

(86) PCT No.: PCT/NL2008/050032
§ 371 (c)(1),
(2), (4) Date: Oct. 9, 2009

(87) PCT Pub. No.: WO2008/088218
PCT Pub. Date: Jul. 24, 2008

(65) Prior Publication Data
US 2010/0044365 A1    Feb. 25, 2010

(30) Foreign Application Priority Data

Jan. 18, 2007   (NL) .................................... 2000441

(51) Int. Cl.
*H05B 3/68*          (2006.01)

(52) U.S. Cl. ................. 219/443.1; 219/44.1; 219/460.1; 219/461.1

(58) Field of Classification Search .... 219/443.1–444.1, 219/460.1–461.1
See application file for complete search history.

(56) References Cited

U.S. PATENT DOCUMENTS

| 4,356,381 A | 10/1982 | Flaherty, Jr. et al. |
| 4,888,465 A * | 12/1989 | Hoffmann ...................... 99/307 |
| 5,081,915 A | 1/1992 | Beumer |
| 6,124,574 A * | 9/2000 | Knepler ...................... 219/447.1 |

FOREIGN PATENT DOCUMENTS

| DE | 84 12 545 U1 | 5/1985 |
| DE | 201 08 843 U1 | 10/2001 |
| EP | 0 514 680 A2 | 11/1992 |
| EP | 0 539 307 A1 | 4/1993 |
| LU | 69 197 | 4/1974 |

* cited by examiner

*Primary Examiner* — Cuong Q Nguyen
(74) *Attorney, Agent, or Firm* — Fliesler Meyer LLP

(57) ABSTRACT

The invention relates to a hotplate, comprising a metal plate part and an electric heating element fixed on the lower side of the plate part. The hotplate furthermore comprises a ring. The ring is made of electrically insulating plastic, and the plate edge is accommodated in a watertight manner on the inside of the ring.

14 Claims, 2 Drawing Sheets

HOTPLATE, AND ALSO ASSEMBLY COMPRISING SUCH A HOTPLATE

The present invention relates to a hotplate, comprising:
a metal plate part having an upper side on which an object to be kept hot can be placed, having a lower side and having a plate edge defining the circumference of the plate part; and
an electric heating element fixed on the lower side of the plate part and equipped for heating said plate part.

Such hotplates are generally known and are used, inter alia, in coffee-making machines and also in other environments, and even completely separately from any other machine.

The object of the present invention is to provide an improved hotplate, which can be used in an electrically safe manner in a moist or wet environment.

This object is achieved according to the invention (a first aspect of the invention) by providing a hotplate, comprising:
a metal plate part having an upper side on which an object to be kept hot can be placed, having a lower side and having a plate edge defining the circumference of the plate part; and
an electric heating element fixed on the lower side of the plate part and equipped for heating said plate part,
a ring;
the ring being made of electrically insulating plastic; and
the plate edge being accommodated in a watertight manner on the inside of the ring.

By fixing the plate part with the plate edge in a watertight manner on the inside of the ring made of electrically insulating plastic, it is ensured that liquid spilt on the top of the hotplate cannot reach the electric heating element on the lower side of the plate part. This is because the electric heating element is fixed on the lower side of the plate part and the plate edge is accommodated in a watertight manner in the inside of the ring. Since the plate edge is accommodated on the inside of the shell edge, the hotplate according to the invention can also be placed in a relatively simple manner electrically insulated in a horizontal wall of a frame without the hotplate needing to project above the surface of said wall in this case. The hotplate can then be placed, as it were, recessed in said wall. Since the thermal conductivity of electrically insulating plastics is relatively low, at any rate compared with the thermal conductivity of the metal plate part, a thermal bridge relative to the surrounding construction is also created, which improves the electrical efficiency of the hotplate.

According to a further embodiment of the invention, the electrically insulating plastic of which the ring is made is so elastically flexible that said ring can absorb thermal expansion of the plate part of the order of 0.4 to 0.6 mm. In other words, the ring is capable of accommodating a metal plate part with a diameter of, for example, 124 mm whose diameter on heating from 20° C. to 180° C. increases by around 0.5 mm to a total of around 124.5 mm. The thermal expansion of the plate part will further improve the watertight fixing of the plate part in the inside of the ring during heating, because the plate edge is pressed more firmly against the ring.

With a view to good electrical insulation and also good thermal insulation, it is advantageous according to the invention if the electrically insulating plastic of which the ring is made comprises a rubber-like material.

Furthermore, it is advantageous according to the invention if the electrically insulating plastic, in particular an electrically insulating plastic in the form of a rubber-like material, has a Shore hardness on scale A of 55 to 85, in particular of approximately 70. With such a hardness the plastic material is, on the one hand, sufficiently rigid to ensure good permanent fixing of the plate part on the inside of the ring and is, on the other hand, still sufficiently flexible to permit such fixing. In the case of a rubber-like material another factor here is that a rubber-like material with such a Shore hardness also has sufficient elastic flexibility to enable it to absorb the thermal expansion of the plate part.

Although different ways of fixing the plate part on the inside of the ring are possible, this fixing is easily achieved in a durable and technically reliable manner if a rib extending around the circumference of the plate part is formed on the outside of the plate edge, and if a groove in which said rib is accommodated is provided on the inside of the ring. The plate part can then be, as it were, forced into the ring on the inside of the ring, in which case the ring will then give slightly until the rib is situated in the groove. The watertight seal can be improved here by fixing the ring in such a way that the ring in the fitted state is under elastic initial tension, which tends to reduce the diameter of the ring.

According to a further embodiment of the invention, it is advantageous if the hot plate further comprises a bowl-shaped shell with a shell edge running in the circumferential direction, which shell edge defines said ring, wherein the shell is made of said electrically insulating plastic. The electric heating element is fixed on the lower side of the plate part and therefore lies inside the bowl-shaped shell. Said bowl-shaped shell is for the rest substantially closed. The bowl-shaped shell also prevents moisture rising from the bottom, for example in the form of condensation, from being able to reach the vicinity of the healing element.

It is furthermore advantageous according to the invention if the plate part and also the heating element lie at a distance above the bottom of the shell. This reduces the risk of the heating element making electrical contact with water and moisture should water and/or moisture enter the shell. The space thereby obtained between, on the one hand, the plate part and the heating element and, on the other hand, the bottom of the shell in this case further improves the heat-insulating effect towards the environment, in particular if said space is filled with gas, in particular air. Gas, such as air, is in fact a relatively poor heat conductor. This insulating effect occurs according to the invention already when there is a relatively short distance between the plate part and the bottom of the shell. The distance from the plate part to the bottom of the shell here according to the invention is at least 4 mm, preferably at least 7 mm.

According to a further embodiment, a passage is provided in the shell, in particular in the bottom of the shell, for electric cord to the heating element in order to provide the power supply to the heating element. Providing such a passage in the shell reduces the risk of any moisture possibly entering the shell through this passage reaching the vicinity of the heating element. By making the passage in the form of a slot whose width is less than the thickness of said electric cord, it is ensured, on the one hand, that the electric cord is easy to insert through the slot and, on the other hand, that the slot seals around the electric cord, thereby preventing moisture from penetrating through said slot. The penetration of any moisture is prevented in particular by making the slot in the form of a so-called self-closing slot. The term self-closing slot here is understood to mean a slot which closes by itself when no electric cord is sticking through it. In particular, when a sufficiently elastically flexible plastic material is used, such as a rubber-like material, a very good seal can be achieved here when an electric cord is pushed through said slot.

According to the invention, the heating element can be a so-called PTC (Positive Temperature Coefficient) element.

So-called PTC elements such as heating elements are known as such in the prior art, also in the case of hotplates. The advantage of PTC elements is that they can be set in such a way that the electrical connection is switched off automatically when the element reaches a predetermined temperature. The temperature switch is, as it were, integrated in the heating element here. Other heating elements can, however, also be used in a hotplate according to the invention.

According to a second aspect, the present invention relates to an assembly comprising a pot and a hotplate according to the invention, in which the pot has a bottom which can be placed flat on the upper side of the hotplate. The bottom of the pot and the upper side of the hotplate in this case connect so as to, as it were, interlock with each other. This improves the heat transfer from the hotplate to the pot and through the pot to the contents of the pot.

According to a third aspect, the invention relates to an assembly, comprising a housing and a hotplate according to the invention, the housing having an upwardly facing, in use horizontal, wall in which a hole is formed, said hole having a hole edge, wherein the ring of the hotplate is fixed in the hole edge so as to interlock in a watertight manner. In this way it is ensured that water cannot pass from the upper side of the hotplate into the interior of the housing.

Fitting of the hotplate in the housing is easily achieved by fixing the hotplate on the housing by means of a snap connection between the hole edge and the ring. The hotplate can then be fixed on the housing by pressing its ring into the hole edge until the snap connection goes into operation. Further simplification of the assembling operation is achieved here if the snap connection is designed in such a way that it allows the hotplate to be placed in the hole from the top and snapped in, and in such a way that it prevents the hotplate from being removed from the hole in the upward direction. This means that the hotplate is placed in the hole in the housing from the outside, and is not placed in the hole in the housing from the inside. From the outside, space will always be present because during use an object such as a pot must also be able to stand on the hotplate.

In the case of the assembly according to the third aspect of the invention it is furthermore advantageous if the hole edge tapers from the top downwards and if the ring tapers correspondingly on the outside. This ensures that the hotplate cannot be pressed fully into the housing when said hotplate is placed under too great a load. The tapering hole edge and the ring correspondingly tapered on the outside will in fact prevent the hotplate from being pressed down too far in the hole. It is furthermore advantageous here according to the invention if the tapers run at an angle relative to the vertical which lies in the range from 35° to 55°. This angle can be, for example, approximately 45°. On the one hand, such a taper ensures in a very reliable manner that the hotplate essentially can never be pressed fully through the hole, while a sufficiently sturdy, possibly tight fit can still be ensured. If desired, the hotplate can be fixed in the hole under a certain prestress, in such a way that a radially inwardly directed initial tension force is exerted from the outside upon the ring. On the other hand, such a taper permits some expansion of the ring in the upward direction, which can contribute to the capacity for absorbing thermal expansion of the plate part.

In this third aspect it is further advantageous, especially in combination with the snapconnection, if, viewed in mounted condition for use, said rib formed on the outside of the plate edge is arranged horizontally alongside the tapers of the hole edge and ring. This ensures a sturdy mounting, which prevents coming loose of the plate from the ring.

According to a further embodiment of the third aspect of the invention, the assembly furthermore comprises a water reservoir supported by the housing. According to yet a further embodiment, the hotplate is situated above the water reservoir in this case.

According to yet a further embodiment of the third aspect of the invention, the housing is equipped with a coffee-making machine.

According to yet a further embodiment of the third aspect of the invention, the assembly furthermore comprises a pot, the pot having a bottom which can be placed flat on the upper side of the hotplate. Advantages of this embodiment have already been explained above.

The present invention will be explained in greater detail below with reference to an example illustrated diagrammatically in the drawings, in which.

Figure 1:
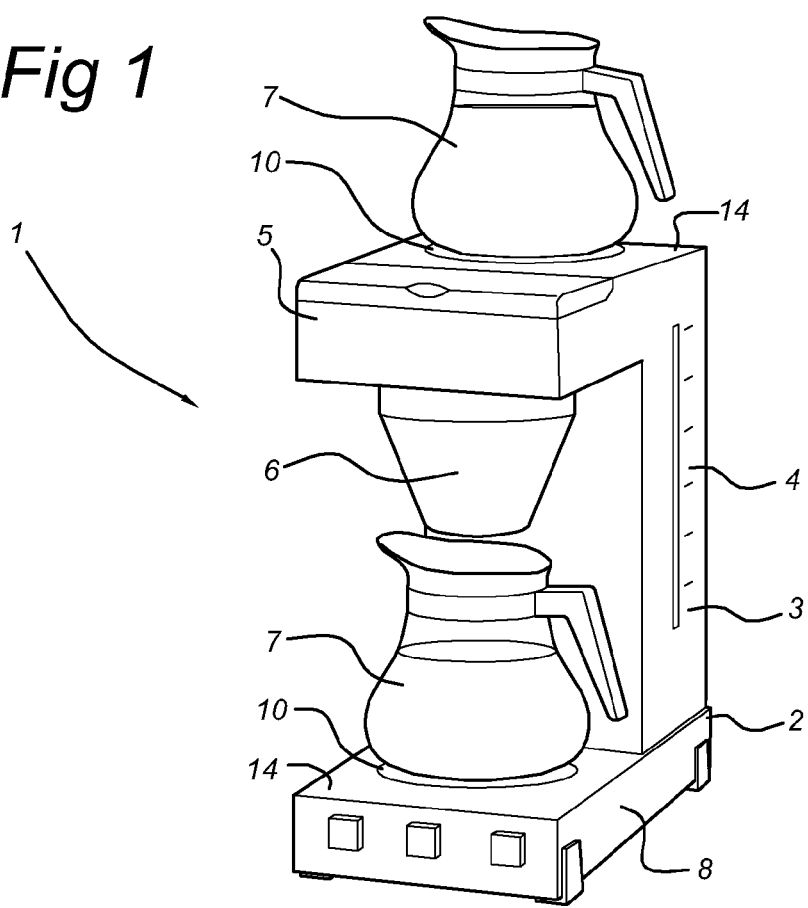
FIG. 1 shows a diagrammatic perspective view of two hotplates according to the invention used in combination with a coffee-making machine.

FIG. 1 shows diagrammatically an assembly 1 according to the invention. The assembly 1 comprises a housing 2, equipped with a coffee-making machine and provided with two hotplates 10 according to the invention. The housing 2 comprises a water reservoir 3 with a filling level indicator 4. A bearing arm 5, beneath which a funnel-shaped coffee filter holder 6 hangs, is provided on the upper side of the water reservoir 4. A coffee pot 7 is disposed below the filter holder 6. Said coffee pot 7 stands on a hotplate 10 according to the invention, which is supported by the base 8 of the housing. Three buttons are provided on the front side of the base 8, by means of which buttons the coffee-making machine can be operated, and which can be provided with lighting in order to indicate the operational state of the coffee-making machine. A further hotplate 10 according to the invention is provided on top of the bearing arm 5, above the water reservoir 3, on which hotplate a further pot 7 with coffee stands. In this way it is possible to keep hot a pot of coffee in stock and simultaneously be making the next pot of coffee.

Figure 2:
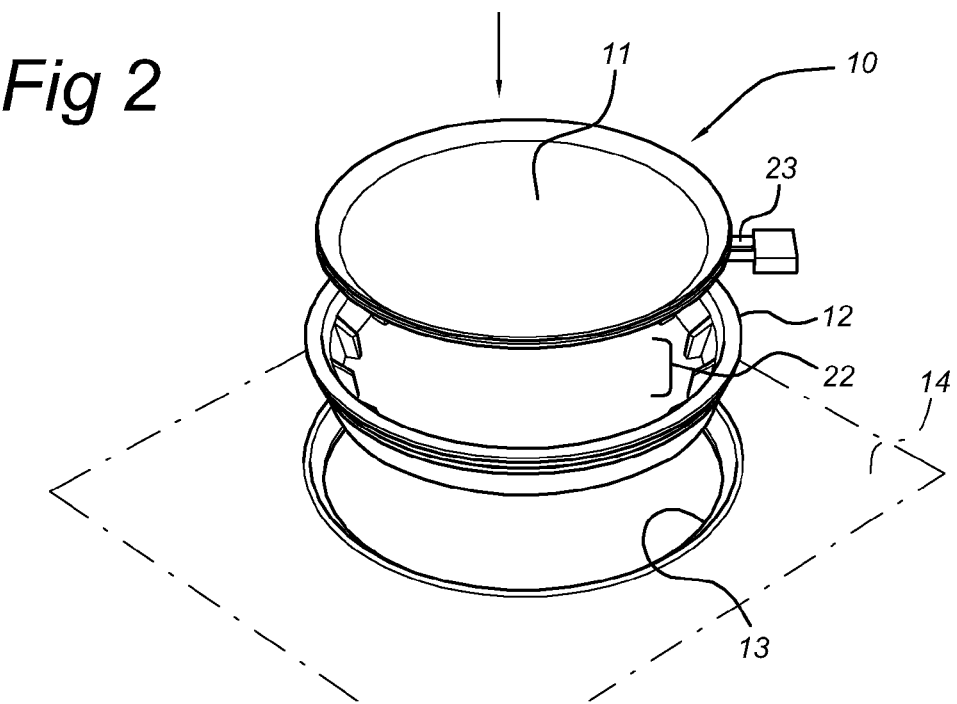
FIG. 2 shows in perspective and with parts disassembled a hotplate according to the invention.
Figure 3:
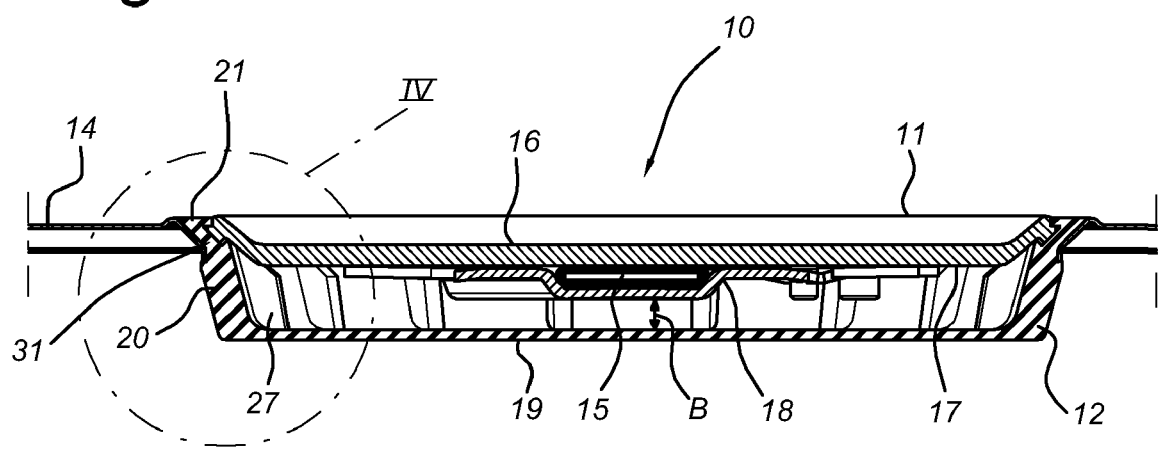
FIG. 3 shows diagrammatically in section a view of a hotplate according to the invention in a state mounted in a horizontal wall.
Figure 4:
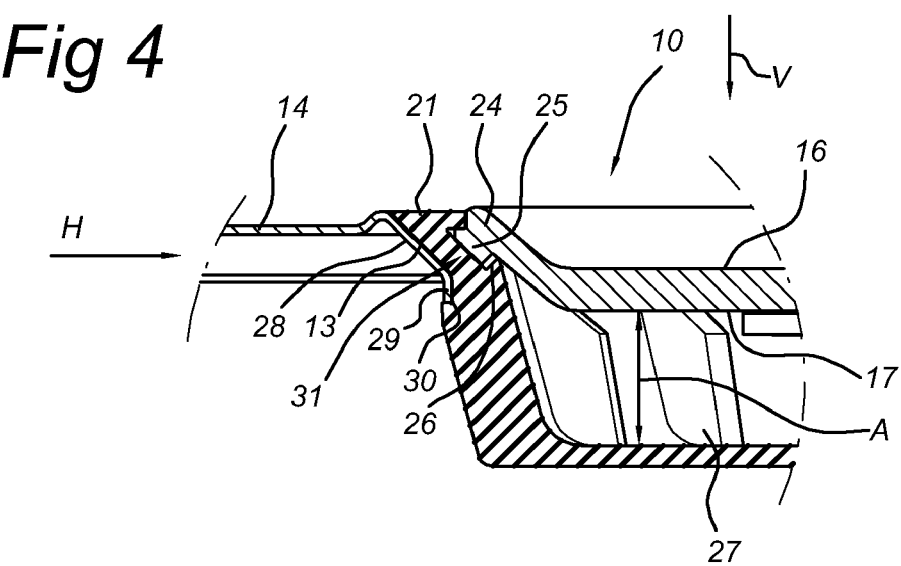
FIG. 4 shows detail IV from FIG. 3 on an enlarged scale.

One embodiment of the hotplate 10 according to the invention is shown in greater detail in FIGS. 2, 3 and 4. The hotplate 10 according to the invention is made up of essentially three parts, viz.:

a metal plate part 11;
a ring 31 of electrically insulating plastic; and
a heating element 15, in this case a so-called PTC element.

In this embodiment, the ring 31 is formed by the shell edge 21 of a shell 12. However, the ring 31 does not need to be part of a shell.

The plate part is made of metal (which is also understood to include alloys). The plate part 11 is in particular made of a sheet of aluminium or an aluminium alloy. The plate part 11 has an upper side 16 and a lower side 17. The upper side 16 is advantageously provided with a special ceramic layer, which makes this surface wearproof. Such ceramic layers are known as such in the prior art. The heating element 15 is mounted against the lower side 17 of the plate part 11 by means of a bracket 18. Of course, this mounting is such that the heat-transferring contact between the heating element 15 and the plate part 11 is optimal.

The bowl-shaped shell 12 is made of an electrically insulating plastic. Said plastic is in particular a synthetic rubber. In the case of this exemplary embodiment the plastic used is VMQ (silicone rubber) with a Shore hardness on scale A of approximately 70. The bowl-shaped shell 12 can be produced as a one-piece injection moulded product. The bowl-shaped shell 12 has a bottom 19, which is surrounded by a wall 20 on the outside. The upper side of this wall 20 is indicated by the shell edge 21. The bottom 19 and wall 20 of the bowl-shaped shell 12 are essentially closed. The U-shaped slot 22 (which slot can also be of a different shape, or a number of slots can also be provided) in the bottom 19 essentially forms the only non-tight part of the bottom and side walls of the bowl-shaped shell 12. Said U-shaped slot 22 is designed to be self-closing and is used for passing through the electric cord 23 of the heating element 15.

The plate edge 24 is accommodated in a watertight manner on the inside of the shell edge 21. This can be achieved in various ways. According to the advantageous embodiment illustrated, this is achieved by providing a rib 25 on the outside of the plate edge 24, which rib extends in the circumferential direction of the plate part 11, and by forming a groove 26 in which the rib 25 can be accommodated on the inside of the shell edge 21. The cross-sectional shape of the rib 25 and the cross-sectional shape of the groove 26 can correspond to each other, but the cross-sectional shape of the groove can also differ slightly, in particular can have slightly larger dimensions. In order to support the lower side of the plate part 11 at a distance above the bottom 19 of the shell 12, supporting members 27 are provided along the wall 20 of the shell.

In FIGS. 2, 3 and 4 a horizontal wall of a housing is indicated by 14. Said wall 14 here is by way of example made of sheet material, in which a hole 13 is formed with the dimensions corresponding to those of the shell edge 21. As can be seen well in FIG. 4 in particular, the hole 13 has a hole edge 28, which tapers downwards and bears a cylindrical part 29 on the lower side. The ring 31 formed by the shell edge 21 is made of a corresponding design tapering downwards on the outside and is provided with a nesting place for the cylindrical part 29. Said nesting place for the cylindrical part 29 is bounded on the lower side by a snap lug 30, which is formed integrally with the shell.

In FIG. 4, one can see that, in mounted condition ready for use, the rib 25 of plate edge 24 lies horizontally alongside the tapers of the ring 31 and hole edge 13. The term 'horizontally alongside' means so to say on one horizontal line. The horizontal direction is indicated by arrow H.

The hotplate according to the invention can be fitted essentially in two ways in a hole 13. The shell 12 can first be pressed downwards in the direction of the arrow V into the hole 13 until the snap connection produced by the cylindrical part 29 and the snap lug 30 interlocks, and only then is the plate part 11 pressed down from the top in the direction of arrow V into the shell 12 until the rib 25 is accommodated in the groove 26. It is, however, also possible—and this will be the preferred method—first to fix the plate part 11 in the shell 12 and then to press the whole unit in the direction of arrow V into the hole 13 until the snap connection 29, 30 has interlocked.

In the exemplary embodiment shown the distance A between the lower side 17 of the plate part 11 and the bottom 19 of the shell 12 is approximately 9 mm and the distance B between the lower side of the bracket 18 (below the heating element 15) and the bottom 19 of the shell 12 is approximately 4 mm. The diameter of the plate part 11 in this exemplary embodiment is approximately 124 mm and the aluminium alloy of which this plate part is made has the tendency when there is a temperature increase of approximately 160° C. to expand by 0.5 mm (so that the diameter then increases to approximately 124.5 mm under the influence of thermal expansion).

The construction according to the invention provides various advantages such as:
  all electrical parts of the hotplate are fully electrically insulated relative to the device in which the hotplate is fitted;
  from the outside of said device a completely waterproof seal is ensured;
  from the inside of said device a completely splashproof seal of the electrical parts of the hotplate relative to the remainder of the device is ensured;
  as can be seen in FIGS. 3 and 4, a substantially flat connection of the hotplate to the surrounding wall 14 of a frame can be achieved;
  the hotplate can be fitted quickly in the device without screws from the upper side/outside;
  the snap connection ensures that after fitting the hotplate can no longer be removed from the outside, or at least cannot be removed without excessive force;
  very good temperature insulation relative to the remainder of the device is achieved through the fact that, on the one hand, conduction of heat from the plate part 11 to the wall 14 is interrupted by a thermal bridge, and through the fact that, on the other hand, heat insulation is achieved on the lower side by providing the bottom of the shell at some distance from the plate part 11;
  expansion of the plate part 11 as a result of heat is absorbed very well in the shell edge 21;
  through the recessed position of the hotplate, the device in which said hotplate is provided is easy to clean well and a pot can be placed in position more easily;
  the shell edge can be made in a distinctive colour (luminous colour), so that the location of the hotplate is clearly marked.

The invention claimed is:

1. Hotplate (10) comprising:
  a metal plate part (11) having an upper side (16) on which an object (7) to be kept hot can be placed, a lower side (17) and having a plate edge (24) defining the circumference of the plate (11),
  an electric heating element (15) fixed on the lower side (17) of the plate part (11) and equipped for heating said plate part (11),
  a ring (31) of electrically insulating plastic, having at an outer surface a snap connection (29,30) for engaging with a hole edge (28) of a substantially circular hole (13) in a housing (2), characterised in that,
the ring is formed of a plastic material having a Shore hardness on scale A of between 55 and 85, the ring having a tapering outer edge tapering downwards for engaging with the hole edge (28) of corresponding taper in a fluid-tight manner, the ring being provided along an inner surface with a circular groove (26) bounded on three sides by the ring material for receiving a circular plate edge (24) being received in said groove (26) in a watertight manner.

2. Hotplate according to claim 1, the taper running at an angle relative to the vertical (arrow V) which lies in the range from 35° to 55°.

3. Hotplate according to claim 1 or 2, wherein a rib (25) extends around the circumference of the plate part (11) on the outside of the plate edge (24).

4. Hotplate according to claim 3, the rib (25) having a top surface extending substantially parallel to the upper side (16) and a side surface extending substantially parallel to the taper of the ring (31).

5. Hotplate according to claim 1, in which the snap connection (29,30) is designed in such a way that it allows the hotplate to be placed in the hole (13) from the top and to be snapped in, and such that it prevents the hotplate (10) from being removed from the hole (13) in the upward direction.

6. Hotplate (10) according to claim 1, further comprising a bowl-shaped shell (12) with a shell edge (21) running in the circumferential direction, which shell edge forms said ring (31), wherein the shell is made of electrically insulating plastic.

7. Hotplate (10) according to claim 6, wherein the plate part (11) and also the heating element (15) lie at a distance (A,B) above the bottom (19) of the shell (12).

8. Hotplate (10) according to claim 7, wherein the distance (A) of the plate part (11) from the bottom (19) of the shell (12) is at least 4 mm, preferably at least 7 mm.

9. Hotplate (10) according to any of claims 6-8, wherein a passage (22) is provided in the shell (12), in particular in the bottom (19) of the shell (12), for an electric cord (23) to the heating element.

10. Hotplate (10) according to claim 9, in which said passage is in the form of a slot (22) whose width is less than the thickness of said electric cord (23).

11. Hotplate (10) according to claim 10, in which said slot (22) is in the form of a self-closing slot.

12. Hotplate (10) according to claim 1, in which the heating element is a PTC element (15).

13. Assembly of a hotplate according to claim 1 and a housing (2) in which the hole (13) is provided in a substantially upwardly facing wall (14) of the housing, the hole edge (28) tapering from the top downwards.

14. Assembly according to claim 13, the taper running at an angle relative to the vertical (arrow V) which lies in the range from 35° to 55°.

* * * * *